Figure 3:
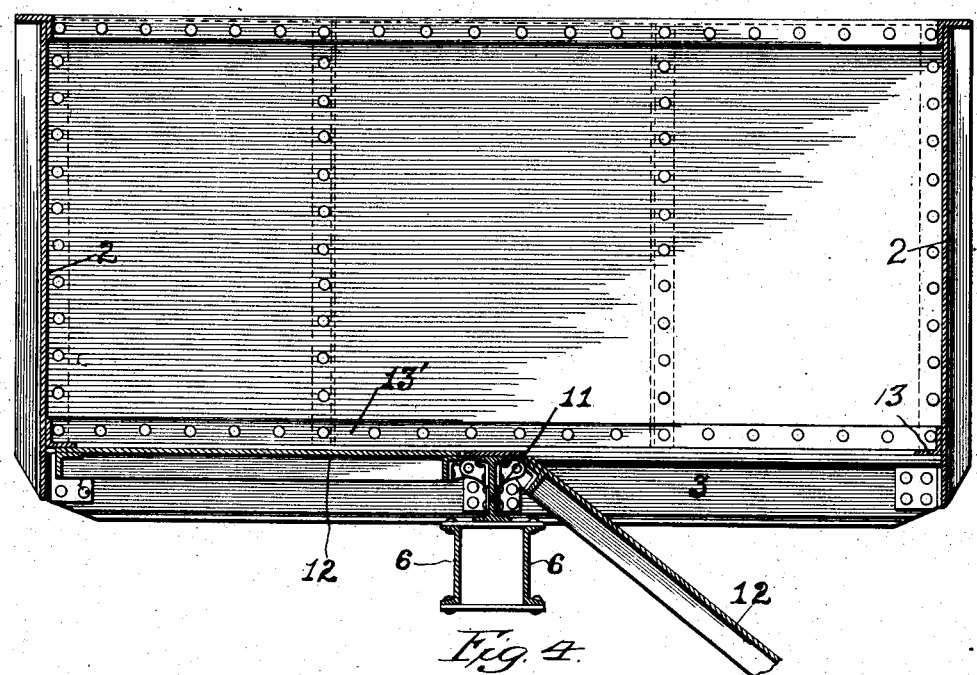

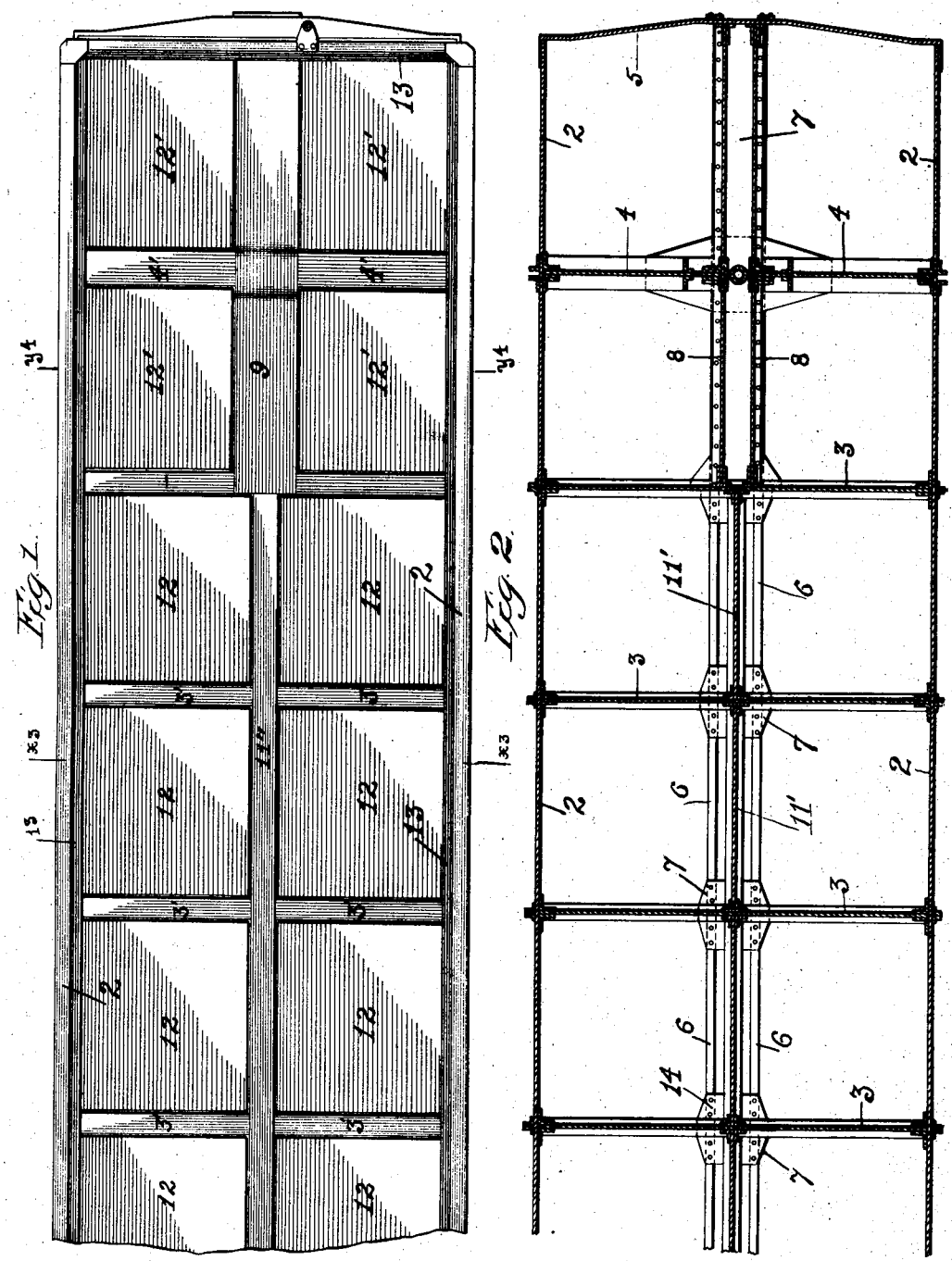

No. 834,824. PATENTED OCT. 30, 1906.
A. LIPSCHUTZ.
COMBINATION FREIGHT AND DUMP CAR.
APPLICATION FILED APR. 1, 1904.

3 SHEETS—SHEET 2.

Witnesses:
Inventor
Arthur Lipschutz.
By

No. 834,824. PATENTED OCT. 30, 1906.
A. LIPSCHUTZ.
COMBINATION FREIGHT AND DUMP CAR.
APPLICATION FILED APR. 1, 1904.
3 SHEETS—SHEET 3.
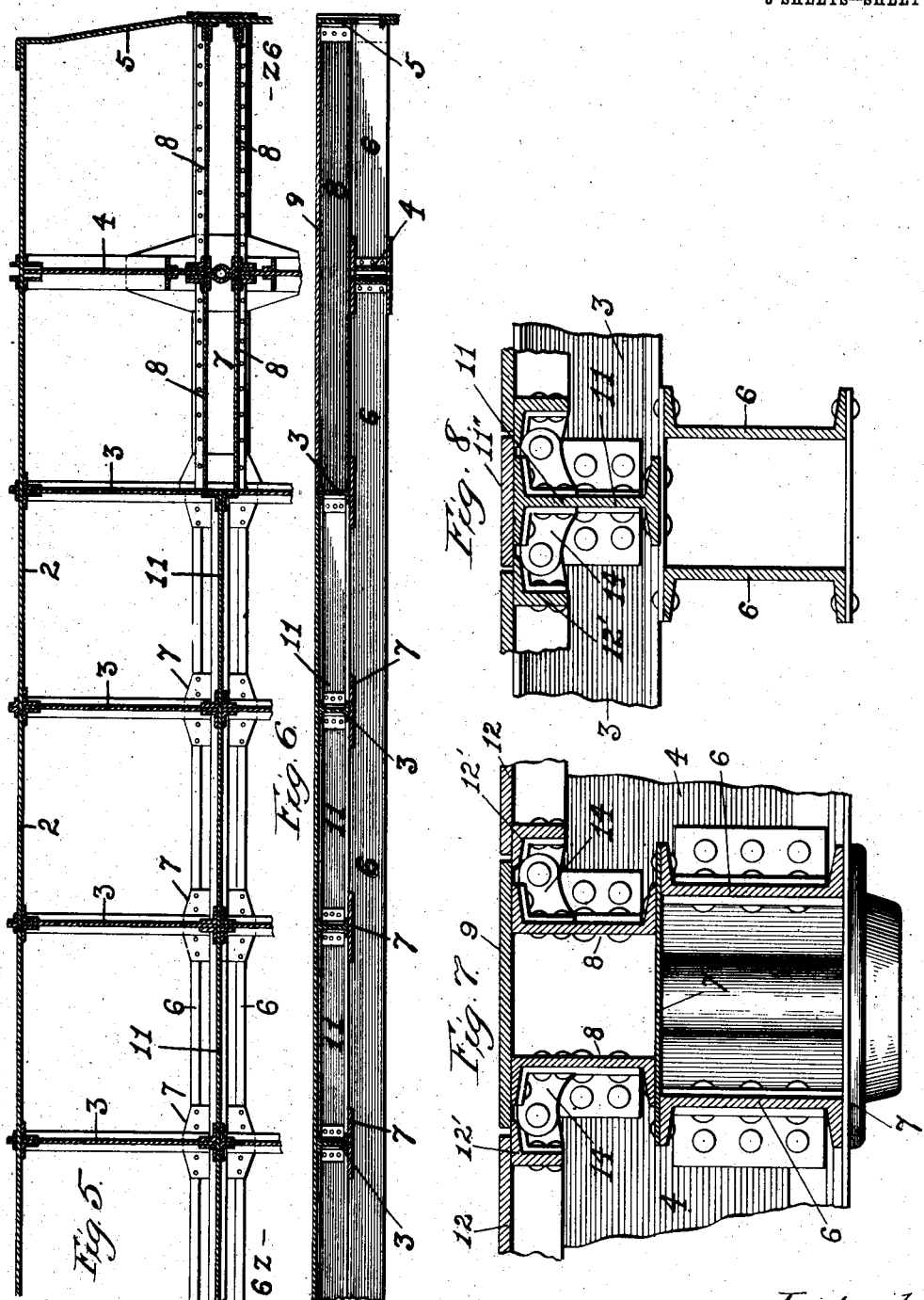
Witnesses:
Inventor:
Arthur Lipschutz.

UNITED STATES PATENT OFFICE.

ARTHUR LIPSCHUTZ, OF ST. LOUIS, MISSOURI, ASSIGNOR, BY DIRECT AND MESNE ASSIGNMENTS, TO NATIONAL COAL DUMP CAR COMPANY, A CORPORATION OF SOUTH DAKOTA.

COMBINATION FREIGHT AND DUMP CAR.

No. 834,824.     Specification of Letters Patent.     Patented Oct. 30, 1906.

Application filed April 1, 1904. Serial No. 201,048.

*To all whom it may concern:*

Be it known that I, ARTHUR LIPSCHUTZ, a resident of St. Louis, State of Missouri, have invented certain new and useful Improvements in Combination Freight and Dump Cars, of which the following is a specification.

My invention relates to railroad-cars, and has particular reference to freight-cars adapted for the transportation of either bulk, piece, or package freight and also adapted for employment as dump-cars in carrying and distributing materials such as coal, sand, gravel, and the like.

The object of my invention is to provide a dumping-car with a straight level floor that shall be substantially wholly composed of drop-doors. A car of this type has an underframe composed of longitudinally and transversely disposed members connected to one another at their ends, leaving large square openings between them. It has proven difficult to make a car of this type strong enough to withstand the shocks and strains to which it is subjected, and the particular object of this invention is to provide a combined freight and dump car of great strength, but which, nevertheless, shall be of light weight compared with other cars of equal capacity.

A further and particular object of my invention is to provide a freight-car for general use that shall have an extremely strong center sill and yet retain the advantages of a car having an articulated center sill, like that which is shown in Letters Patent No. 750,670 granted to me January 26, 1904.

With these objects in view my invention consists in a combined freight and dump car having an underframe composed of side members connected by tranverse members, in combination with a wide strong reinforcing member incorporated with the underframe in such manner that it does not interfere with the drop of the doors and permits the inner edges of the two rows of doors to be brought close together, avoiding the usual wide ledge between the doors; and my invention further consists in a car of the class described which has side girder-plates or equivalent parts connected by transverse beams, in combination with a center sill underlying said beams and a plurality of doors substantially flush with the tops of said beams; and, further, my invention consists in a car having suitable side members connected by transverse beams, in combination with a light center sill having its top substantially flush with the tops of said transverse beams, suitable floor-forming doors also substantially flush therewith, and a reinforcing load-sustaining center sill underlying said light center sill; and, further, my invention consists in a dump-car comprising a center sill, in combination with transverse elements or beams crossing the top of said center sill, parallel beams or members overlying the center sill at each end of the car connecting the transverse members of such portions, and a narrow beam or beams overlying the intermediate portion of the center sill and connecting the transverse members lying between the ends of the car; and my invention also consists in various details of construction and in combination of parts, all as hereinafter described, and particularly pointed out in the claims.

The invention will be more readily understood by reference to the accompanying drawings, forming a part of this specification, and in which—

Figure 4:
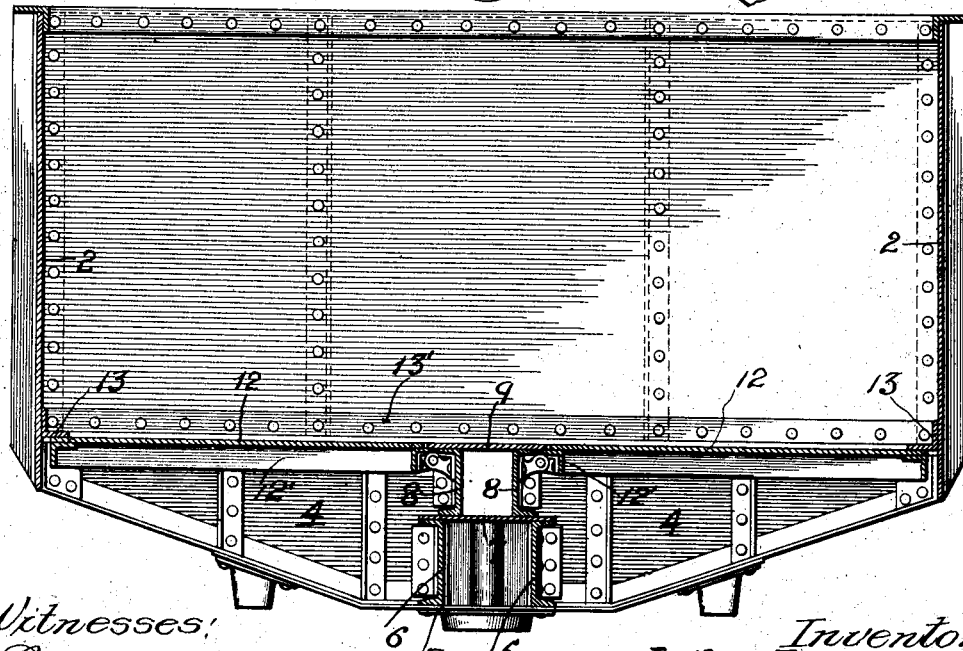

Figure 1 is a plan view of a portion of a car embodying my invention. Fig. 2 is a horizontal section thereof beneath the floor of the car. Fig. 3 is an enlarged cross-section on the line $x^3$ $x^3$, Fig. 1. Fig. 4 is a similar section on the line $y^4$ $y^4$, Fig. 1. Fig. 5 is a plan section similar to Fig. 2, but showing a single beam that constitutes the greater part of the length of the articulated center sill, taking the place of the short section shown in Fig. 2. Fig. 6 is a vertical section on the line $z^6$ $z^6$, Fig. 5. Fig. 7 is an enlarged sectional detail taken from Fig. 4. Fig. 8 is a similar detail taken from Fig. 3.

While my invention is not limited thereto, I prefer the embodiment or structure illustrated in the drawings, finding the same stronger, more simple, lighter, and cheaper than any other thus far devised. Furthermore, although I have illustrated my invention as an all-steel car, it should be understood that it is equally adapted for embodiment in wood.

The gist of my invention, explained fully hereinafter, resides in a car structure wherein a center sill is made to carry the principal weight of the load, but is removed from the level of the other members of the underframe to admit the framing of the door-openings of the car by light narrow members.

A distinct advantage of my invention is that by carrying the weight upon the center sill the sides of the car may be made without heavy side sills, yet while I have illustrated my car as having sides that serve in place of the usual side sills the invention is not confined thereto.

In some cases regular side sills are substituted for the plates shown, in which case the ends of the beams 3 are attached to such sills and the sides of the cars are erected above the sills. The beams 3, that are continuous from side to side, are used in the intermediate portions of the car. At the ends of the car they are replaced by the bolsters 4 and end sills 5. The bolsters and end sills may be of any desired construction; but, as shown, I prefer to employ built-up bolsters and a pressed-steel end sill. The cross members and the side members are joined by angle-plates and rivets and constitute a rigid frame capable of withstanding torsional strains; but these parts unless of great weight would not alone support a load between trucks or withstand heavy pulling and buffing strains. To secure maximum strength with a minimum weight of metal, I incorporate with the underframe of the car a heavy center sill, which underlies the cross beams or members. Virtually the body of the car rests upon this heavy center sill and the cross-beams carry the load on each side thereof. The center sill which I prefer is one constructed of the heavy channel-beams 6 6, connected by top and bottom cover or gusset plates 7. In some cases I extend continuous plates from end to end of the center sill. The bolsters 4 may be notched or built around the center sill and said center sill made to extend from end sill to end sill of the car. I prefer, however, to make the center sills continuous from bolster to bolster only and to provide it with splices between bolsters and end sills. The car when thus constructed may be easily repaired when damaged at its ends. The external appearance of the center sill is the same in both cases, and no attempt is made in the drawings to differentiate between a continuous and a spliced center sill. It will be observed that the cross-beams 3 rest upon and are secured to the tops of the center sill 6 and that the tops of the bolsters 4 and of the end sills 5 rise to the level of the tops of the beams 3. There are therefore spaces above the center sill 6 and between the several transverse members. I utilize these spaces for the longitudinal member or members that divide the floor of the car into the parallel rows of door openings or frames, and by reason of the elevation of the floor-surface above the center sill I am able to use narrow longitudinal parts, whereby the space or ledge between the rows of openings may be cut down to such an extent that it becomes a negligible quantity when considering the self-dumping qualities of the car. I term the complete structure directly overlying the center sill an "articulated sill," as it serves to reinforce the underframe against pulling and buffing strains, as well as serving as a part to which the doors may be hinged. In those cars wherein I employ a spliced center sill 6 I construct the articulated sill in such a manner as to reinforce the splices of the center sill. The articulated sill is composed of three or more lengths, and in every case I prefer that the end sections or lengths of the articulated sill shall extend from the end sill to the first cross-beam 3, thereby bridging the splice of the center sill at the bolster. This feature of my invention is well illustrated in Figs. 2, 5, and 6. Thus at the ends of the car the spaces above the center sill 6 and between the end sill and the first beam 3 are occupied by parallel beams or channels 8. These rest upon the cover-plate of the sill 6 and are riveted thereto and constitute the end section of the articulated sill.

A single rolled or built-up I-beam may take the place of the parallel beams 8 8; but I prefer the latter for two reasons—to wit, because space is afforded between them for the truck center bolt-socket and because I find it advisable to use a wider floor-plate 9 at the end of the car—and it is most convenient to support it near its edges. Plate 9 is usually narrower than the top of the center sill. The beams 8 8 with the plates at top and bottom constitute a very strong box-girder that materially strengthens the car above the truck, being rigidly spliced to the bolster, the center sill, the end sill, and the beam 3. The spaces between the beams 3 over the center sill are occupied by a narrow beam 11, the top of which is flush with the tops of the cross-beams 3. The beam 11 may be in a single length, as shown in Fig. 5; but I prefer to make it in sections 11', as illustrated in Fig. 2, cutting the sections to fit between the beams 3 and splicing the ends thereto. The tops of the cross-beams 3, the bolsters 4, and the longitudinal parts 8 and 11 are covered by narrow floor-plates 3', 4', 9, and 11'' of slightly greater width than the underlying parts to provide flanges that shall overlap the edges of the drop-doors 12. The floor-plates may be omitted when built-up sections 11 and 3 are used. The lower corners of the car-body are framed by the angle-bars 13, having horizontal flanges that rest upon the ends of the cross floor-plates. Similar angle-bars 13' extend across the ends of the car to overlap the edges of the end doors 12. The doors 12 are of any suitable construction; but each is preferably made from a single sheet of metal that is framed on the end and side by angle-bars 12', the horizontal flanges of which extend beyond the edges of the plate. These flanges are adapted to lap beneath the floor-plates or flanges and close the cracks around the doors. The doors 12 are attached by hinges 14 to the sides of the cross members at points near the articulated sill or to the sides of said sill, as preferred. In either case the inner flanges of the doors underlap the extending edges or flanges of the articulated sill.

Any suitable means may be employed for raising and supporting the doors, and when closed they, with the negligible narrow top flanges or floor-plates of the longitudinal and transverse members, constitute a level floor for the car. The floor being level will accommodate any kind of a load. Loads such as coal, coke, sand, gravel, and the like will be entirely discharged from the car without shoveling when the doors are dropped. Limiting-chains are usually applied to the free edges of the doors, and in no case are the doors permitted to drop far enough to strike the upper corners of the underlying center sill. The narrow, upper, or false sill may be in one length from end to end of the car and of uniform top width throughout; but as the doors at the end of the car cannot be fully opened because of the trucks that are beneath them and as their inclination is insufficient when hinged so near the center line of the car-floor I always prefer to use the wide sections 9 over the trucks, thereby removing the hinges of the four end doors far enough from the center to provide sufficient dumping pitch when the doors are dropped. The ends of the car-body may be permanent or hinged, as necessitated by the service for which a particular car is intended.

It is obvious that numerous modifications of the structure herein disclosed will readily suggest themselves to one skilled in the art, and I therefore do not confine my invention to the particular structures and combinations of elements herein shown and described.

Having thus described my invention, I claim as new and desire to secure by Letters Patent—

1. In a dumping-car, a plurality of transverse members, in combination with suitable side members or sills, a center sill having its top substantially in the plane of the tops of the said transverse members, a plurality of doors hinged adjacent to said center sill, and a load-carrying center sill underlying the first-mentioned center sill, substantially as described.

2. In a dumping-car, a plurality of transverse members in combination with suitable side members or sills, a narrow center sill having its top substantially in the plane of the tops of the said transverse members, a plurality of doors hinged adjacent to said center sill, and a load-carrying center sill underlying the first-mentioned center sill, substantially as described.

3. In a dumping-car, a plurality of transverse members, in combination with suitable side members or sills, an articulated center sill having its top substantially in the plane of the tops of said transverse members, said articulated sill being wider at the ends of the car than in the intermediate portion thereof, and a wide center sill underlying said articulated center sill, substantially as described.

4. In a dumping-car, a plurality of transverse members, in combination with suitable side members or sills, a center sill underlying said transverse members, suitable fillers above said center sill and between said transverse members, said fillers and members having suitable floor-plates or flanges, and drop-doors underlying said plates or flanges, substantially as described.

5. In a dumping-car, a plurality of transverse members, in combination with suitable side members or sills, a center sill underlying said transverse members, suitable fillers above said center sill and between said transverse members, said fillers and members having suitable floor-plates or flanges, and drop-doors underlying said plates or flanges, said doors being arranged in two rows extending from end to end of the car, substantially as described.

6. In a dumping-car, a spliced center sill and bolsters, in combination with a plurality of transverse members resting upon said center sill, and an articulated center sill overlying the first-mentioned center sill, joining said transverse members and having sections at its ends that bridge and reinforce the splices of said first-mentioned center sill, substantially as described.

7. In a dumping-car, a wide box-girder-like center sill, bolsters and end sills, in combination with a plurality of transverse members overlying said center sill and having their tops in the plane of the tops of said bolsters, suitable side members or sills, a plurality of drop-doors arranged in the openings between the end sills, bolsters and transverse members, door spacing or dividing members arranged between the transverse parts and above said center sill, substantially as described.

8. In a dumping-car, a wide box-girder-like center sill, bolsters and end sills, in combination with a plurality of transverse members overlying said center sill and having their tops in the plane of the tops of said bolsters, suitable side members or sills, a plurality of drop-doors arranged in the openings between the end sills, bolsters and transverse members, and door spacing or dividing members arranged between the transverse parts and above said center sill, said spacing or dividing members being widened between each group of four end doors, substantially as described.

9. In a dumping-car, a center sill in combination with a plurality of transverse members having their tops in substantially the same horizontal plane and overlying said center sill, a false sill superimposed upon said center sill, and rising to the plane of said transverse members, said members and false sill having suitable floor-plates or flanges, suitable edge floor-plates or flanges, and drop-doors hinged beneath said flanges, substantially as described.

10. In a dumping-car, a wide center sill, in combination with the bolsters framed therewith, suitable end sills, a plurality of transverse beams overlying said center sill, suitable side members or sills, two rows of drop-doors, and the articulated center sill separating said rows, said articulated sill being composed of parallel sections, 8, 8, at its ends, and the single section or sections, 11, in its intermediate portion, substantially as described.

In testimony whereof I have hereunto set my hand, this 27th day of February, A. D. 1904, in the presence of two witnesses.

ARTHUR LIPSCHUTZ.

Witnesses:
  HERBERT W. WOLFF,
  WILL H. STADLER.